Patented June 6, 1950

2,510,852

UNITED STATES PATENT OFFICE 2,510,852

PROCESS FOR PURIFYING PHTHALIC ANHYDRIDE

Maurice E. Bailey, Orchard Park, and John K. Evans, Buffalo, N. Y., assignors to Allied Chemical & Dye Corporation, New York, N. Y., a corporation of New York No Drawing. Application March 19, 1948, Serial No. 15,964

12 Claims. (Cl. 260—342.5)

This invention relates to a process for purifying phthalic anhydride and more particularly to the purification of crude phthalic anhydride containing naphthoquinone bodies, to improve its color and color stability.

Phthalic anhydride as an article of commerce has many and varied uses, a large number of which require it to be substantially free of color and color-forming bodies. Such uses occur in the manufacture of light colored resins, plasticizers for clear lacquers, transparent sheeting, etc.

In the past, phthalic anhydride has been obtained primarily by catalytic air-oxidation of naphthalene vapors through the use of processes wherein the phthalic anhydride vapors produced were condensed by cooling to temperatures not exceeding about 50° C. Crude phthalic anhydride thus obtained usually contains relatively small amounts of impurities such as naphthoquinones, especially 1,4-naphthoquinone, maleic anhydride, benzoic acid and dark colored materials. The crude phthalic anhydride produced by such prior art processes was condensed to solid deposits which were removed from condensers partly in the form of light voluminous masses of long needle-like crystals conveniently called "hay," and partly in the form of dense hard masses conveniently called "scale." Such crude phthalic anhydride is sufficiently colored to be unacceptable for many commercial uses which require a substantially colorless product, and is customarily purified by melting the "hay" and "scale" mixture and subjecting the molten material to an "ageing" treatment whereby the material is kept near its boiling temperature at atmospheric pressure until a sample, when distilled, produces a satisfactory yield of phthalic anhydride distillate of the desired standard of freedom from color. In some unexplained manner such ageing "destroys" the color bodies or renders them non-volatile, and thereby enables the purified phthalic anhydride to be recovered thereafter by volatilization.

It has been found that changes to apparatus and processes to improve efficiency, facility and cost of manufacturing phthalic anhydride by catalytic oxidation of naphthalene vapors so affected the quality of the crude anhydride that it could not be purified satisfactorily by the prior art method consisting solely of the aforesaid heat treatment, i. e. ageing step, and a fractional distillation step. For example, this prior art method of color purification is unsatisfactory when applied to crude phthalic anhydride made by a catalytic oxidation with an air-naphthalene vapor ratio exceeding about 30 to 1, and/or by cooling the hot gases from an oxidation, to about 65° C. or higher, that is to say, to a temperature substantially above that previously used to condense the phthalic anhydride vapors. In the case of such crude phthalic anhydride the prior art color purification treatment, while sometimes providing a good yield of purified phthalic anhydride of initially satisfactory color, fails to provide a purified product of the requisite color stability, even if the heat treatment be carried out in the presence of a catalyst or a promoter such as manganese dioxide, potassium permanganate and powdered iron. Furthermore, although some catalysts such as powdered zinc and zinc oxide assist in obtaining a purified phthalic anhydride product of good color stability from such crude phthalic anhydride, they permit recovery of only relatively low yields of purified product, and hence their use is undesirable. Still other catalysts have been found unsatisfactory for general use, since the finally distilled phthalic anhydride obtained with their aid has a relatively low setting point, an indication that the expected "purified" anhydride contains impurities, possibly degradation products, formed during the heating treatment and distillation.

We have now discovered that a noteworthy difference between the crude phthalic anhydrides made by the former and later processes, referred to above, is that the amount of maleic anhydride which is present as an impurity in the crude material made by the former processes is greater than that present in the crude phthalic anhydride made by the later processes. Thus the amounts of naphthoquinone-like impurities and of maleic anhydride which are contained in a crude phthalic anhydride made according to the earlier processes are generally about equal, but in the crude phthalic anhydride made according to the later processes, the weight of naphthoquinone-like impurities is generally greater than, often about 15 times, that of the maleic anhydride, and frequently this weight-ratio is even greater, depending on particular conditions extant during the catalytic oxidation reaction and the subsequent cooling of the resulting gases.

We have further discovered that maleic anhydride, which is a common impurity in crude phthalic anhydride made by vapor phase catalytic oxidations of naphthalene, plays the surprising and important part in the reaction which is induced by "ageing," as carried out in the prior art purification of such crude products, of changing the color-forming impurities, in some manner, to render them less volatile and thus removable from the crude phthalic anhydride product. The reaction giving rise to this changing effect is not known, but it appears to involve some combination between maleic anhydride and the impurities, especially those of the naphthoquinone type. Thus, the amount of maleic anhydride impurity associated with naphthoquinone-like impurities in the crude phthalic anhydride is an important and hitherto unrecognized factor, which determines the efficacy of the ageing step in the purification by a heat treatment and fractional distillation of crude phthalic anhydride.

It is an object of the present invention to provide an improved process for purifying crude phthalic anhydride which contains impurities of the type of naphthoquinone.

It is a further object of the invention to provide a process for purifying crude phthalic anhydride products containing a deficiency of maleic anhydride type of impurity relative to the naphthoquinone type of impurity.

It is a still further object of the invention to provide a process for purifying crude phthalic anhydride prepared by the catalytic oxidation of naphthalene vapors wherein the crude phthalic anyhdride product is initially condensed at a temperature of 65° C. or higher, and which cannot be satisfactorily purified by the heretofore used simple heating or "ageing" process.

These and other objects are accomplished according to the improved process of this invention whereby crude phthalic anhydride, of the character described, is heated in the presence of an added quantity of a substituted or unsubstituted butene-1,4-dioic acid or anhydride thereof, sufficient to substantially completely react with the color-forming impurities present to change them to a removable form, and thereafter recovering the purified phthalic anhydride in standard manner by volatilization or the like.

The improved process according to the present invention is adapted for the purification of any crude phthalic anhydride product which contains naphthoquinones or derivatives thereof as impurities. As pointed out above, the improved method is particularly useful in purifying a crude phthalic anhydride which is prepared by catalytically oxidizing naphthalene vapors with air and recovering the crude product by the relatively newer methods of conducting the hot gases from the oxidation through a condenser wherein the gases are cooled to a temperature between about 65° and about 75° C., thereby causing the crude phthalic anhydride to deposit in the condenser as a solid, and periodically thawing the solid deposit and removing the product as a liquid from the condenser, while diverting the gas stream containing phthalic anhydride vapors to another condenser. Crude phthalic anhydride product thus prepared may contain as much as 4% or more by weight of naphthoquinone bodies and as little as 0.1% by weight and in some cases even no detectable quantities of maleic anhydride. Such crude phthalic anhydride cannot be purified by the usual heat treatment.

In carrying out the process according to this invention the crude phthalic anhydride product containing a naphthoquinone type impurity is melted or fused, and a small quantity of a butene-1,4-dioic acid or anhydride thereof is added and suitably mixed therewith. The mixture is then heated, conveniently under atmospheric refluxing conditions, to a temperature between about 270° C. and about 285° C. for a sufficient length of time to permit substantially complete reaction of the colored and color-forming impurities with the butene-1,4-dioic acid or anhydride. A period of between about 2 and 10 hours is usually sufficient. After the conversion of the colored and color-forming impurities is complete, the phthalic anhydride may be separated therefrom and recovered in conventional manner as by fractional distillation.

The effective temperature range for the heat treatment in the process of the present invention begins at about the temperature at which the phthalic anhydride melts to provide a liquid stirrable mass and extends beyond the boiling point of the phthalic anhydride. When the heating is effected at a temperature above the boiling point of the employed butene-1,4-dioic acid or of its anhydride, the treatment is carried out under a reflux condenser to prevent loss of the purifying agent through volatilization. For practical operation it is preferred to conduct the heat treatment at temperatures above about 200° C. and especially close to the boiling point of phthalic anhydride under ordinary pressure, i. e. about 285° C., since the rate of purification becomes unduly and progressively slower as the temperature is materially reduced below 200° C. While the rate of purification may be further increased by heating at temperatures above 285° C., such advantage is not great, and is offset by the necessity of working under superatmospheric conditions. Thus it is possible to conduct the purification with normal results at a temperature as high as about 305° C., which may be reached by providing a sufficient superatmospheric pressure of vapors over the distilland.

The color and color-forming bodies which are primarily present in crude phthalic anhydride formed by processes of the type described above, and which are readily removed by the process of this invention, include primarily those of the type of naphthoquinones, especially 1,4-napthoquinone, and also derivatives and polymers of the naphthoquinones. Wherever the term "naphthoquinone" is used in the specification and claims, it is to be understood that all the compounds of the above type present in the phthalic anyhdride crude are intended to be included.

The butene-1,4-dioic acids and their anhydrides in both their unsubstituted and substituted forms, can be used to convert color and color-forming bodies to removable form. As suitable acids and anhydrides of the above character, there may be mentioned maleic acid, fumaric acid, citraconic acid, i. e., methyl maleic acid, chloromaleic acid, bromomaleic acid, maleic anhydride, chloromaleic anhydride, citraconic anhydride, pyrocinchonic anhydride, i. e. dimethyl maleic anhydride. When the term "butene-1,4-dioic acid" is used throughout the specification and claims, it will be understood that it is intended, unless otherwise indicated by the context, to include both the acids and anhydrides thereof.

The preferred butene-1,4-dioic acids and anhydrides employed in the process of this invention contain not more than six carbon atoms, and of this group the acids and anhydrides which are specially preferred have the following general formulas:

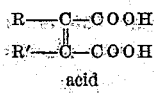
acid and

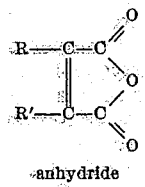
anhydride wherein R and R' are selected from the group consisting of hydrogen, halogen and alkyl groups. Commercially acceptable purified phthalic anhydride, which is said to be substantially free of color initially and sufficiently color stable on storage to resist color formation over a period of time, has been prepared by successful application of the "ageing" and fractional distillation of crude phthalic anhydride made by the earlier processes hereinbefore noted. Such commercially acceptable purified phthalic anhydride usually exhibits an initial color of less than 40 as measured by the well known "Platinum-Cobalt" color test described below, and is characterized by a color stability which enables the purified product to be stored under atmospheric temperature conditions for several months with relatively little increase in its color. The effect of such storage can conveniently be simulated by an "accelerated ageing" treatment wherein a purified phthalic anhydride distillate is heated to an elevated temperature for several hours, for practical purposes, four hours at about 180° C. Purified phthalic anhydride, prepared and purified according to prior art practices, is usually considered acceptable in color stability if it does not attain a Platinum-Cobalt color exceeding about 55 when submitted to this practical "accelerated ageing." Crude phthalic anhydride which is prepared and recovered according to the later type processes described above, and which cannot be purified by the usual prior art heat treatments, even as modified by catalysts as described, can be purified according to the process of this invention to provide a commercially acceptable phthalic anhydride which is characterized by an initial color equal to or better than that represented by the Platinum-Cobalt index 40, and by a color stability which is measured by development of a color equal to or better than that of a Platinum-Cobalt index of 55 when the purified anhydride is subjected to the "accelerated ageing" test described above. In any case, when, in accordance with the improved process of this invention, a crude phthalic anhydride is mixed with a small amount of maleic anhydride and then is subjected to a prior-art heat treatment and fractional distillation, the resulting distillate of purified phthalic anhydride has a better color stability and generally a better initial color than the purified phthalic anhydride recoverable by treating the same crude phthalic anhydride without the addition of maleic anhydride, but otherwise in exactly the same manner.

The so-called "Platinum-Cobalt" (Pt-Co) color test referred to above comprises a comparison of the color of molten phthalic anhydride with a set of color standards wherein each color standard bears a number which is synonymous with the shade of a specific dilution of a stock aqueous solution of potassium chloroplatinate and cobalt chloride. The stock solution is prepared by adding 100 cc. of concentrated hydrochloric acid, Sp. Gr. 1.18, to a solution of 1.246 grams of potassium chloroplatinate ($K_2PtCl_6$), corresponding to 0.50 gram of platinum, and 1.00 gram of cobalt chloride hexahydrate ($CoCl_2.6H_2O$), corresponding to 0.25 gram of cobalt, in distilled water, and diluting the resulting solution with distilled water to a volume of one liter. The stock solution thus prepared is given a color number of 500 and the remaining color numbers of the scale are ascribed to solutions obtained by specific degrees of dilution of the stock solution as follows:

| Color Number | Dilution (parts by volume of distilled water per part of stock solution) |
|---|---|
| 10 | 49 |
| 20 | 24 |
| 40 | 11.50 |
| 50 | 9.00 |
| 60 | 7.30 |
| 80 | 5.25 |
| 100 | 4.00 |
| 150 | 2.33 |
| 200 | 1.50 |
| 300 | 0.67 |
| 400 | 0.25 |
| 500 | 0.00 |

To determine the color number of a purified phthalic anhydride, a molten sample of the latter is compared, under substantially identical conditions, with standard solutions which correspond to those identified by the numbers in the foregoing color scale; the number of the solution whose color is most closely approximated by the color of the molten anhydride is said to be the color number of the latter. Or, the evaluation may be carried out through the aid of so-called "Hazen" platinum-cobalt and calomel solution standards described under the heading "Parlin Color Standards" on page 71 of "Physical and Chemical Examination of Paints, Varnishes, Lacquers and Colors" by Henry A. Gardner, 9th edition (1939).

The yields of purified phthalic anhydride obtained in the purification process of this invention are comparable to those obtained in the most satisfactory prior-art processes and usually amount to between about 70% and 90% of higher based on the weight of crude phthalic anhydride processed, the major portion of the yields being obtained in a "main fraction," further portions being recoverable by further processing of the "lights" and "tails" fractions.

The quantity of butene-1,4-dioic acid used will depend upon one or more of the variables: (1) the quantity of naphthoquinone impurities present in the crude phthalic anhydride, (2) the quantity of butene-1,4-dioic-acid type impurity already present, (3) the extent of purification desired. To obtain a purified phthalic anhydride which is substantially colorless and has a commercially acceptable color stability the amount of added butene-1,4-dioic acid should be sufficient to substantially completely react with the naphthoquinone bodies present to render them nonvolatile and thus removable by subsequent volatization of the phthalic anhydride. The amount of butene-1,4-dioic acid required can be ascertained empirically by a series of tests, wherein samples of crude phthalic anhydride are "aged" under like conditions with increasing proportions of butene-1,4-dioic acid, and noting the ratio of weights of butene-1,4-dioic acid to crude phthalic anhydride in the sample which yields a distillate of the desired color properties. In general, the use of an amount of butene-1,4-dioic acid or anhydride thereof which is more than sufficient to combine with or bind the coloring impurities and thus leave free butene-1,4-dioic acid or the anhydride thereof in the treated crude phthalic anhydride is not harmful, since the excess can be separated in the subsequent fractional distillation step, as illustrated in the examples; or when a relatively non-volatile purifying agent, such as fumaric acid is employed, as described below, excess thereof remains behind in the distillation residue and is thus separated from the volatilized phthalic anhydride. However, addition of an excess of a butene-1,4-dioic acid or anhydride thereof which boils at or near the boiling temperature of phthalic anhydride under like pressure should be avoided since the excess, in part or whole, may distill with and thus contaminate the phthalic anhydride subsequently recovered by distillation.

In general, it is preferable to use a quantity of butene-1,4-dioic acid equal in weight to at least about one tenth of the weight of the naphthoquinone present. Types of crude phthalic anhydride which are prepared by recently developed processes described above, for example processes involving cooling of the hot gasses from the vapor-phase air-oxidation of naphthalene to temperatures above about 65° C., contain quantities of naphthoquinone which range between about 1.7% and about 4% and usually average between about 2.5% and about 3% by weight of the crude phthalic anhydride; and usually they also contain only small quantities of maleic anhydride which range from zero to about 0.6% and average about 0.2% by weight of the crude phthalic anhydride. In an ageing treatment according to the improved process for purifying such crude phthalic anhydride, an addition of a quantity of a butene-1,4-dioic acid between about 0.25% and about 1% of the weight of the crude phthalic anhydride is usually sufficient to produce satisfactory color and color stability.

If the quantity of butene-1,4-dioic acid used is to be determined on the basis of the naphthoquinone and butene-1,4-dioic acid type impurities already in the crude, the contents of these impurities may be determined polarographically in the following manner.

The determination is based on the principle that naphthoquinone is reduced at the dropping mercury electrode at a half-wave potential of minus 0.1 volt versus the saturated calomel electrode at pH 6. A solution containing not more than 0.050 gram naphthoquinone per liter gives a diffusion current directly proportional to the concentration of naphthoquinone.

A weighed sample of the crude phthalic anhydride is dissolved in acetone to produce a solution containing not more than 0.1 gram of 1,4-naphthoquinone per 100 cc. of solution. Five cc. of the solution are pipetted into a 100 cc. volumetric flask, 50 cc. of 1% KH₂PO₄ are added, and the mixture is diluted to 100 cc. with distilled water, and well shaken. A suitable amount of the solution is placed in an electrolysis cell immersed in a constant temperature bath at 30° C., and a current of oxygen-free nitrogen is passed through the solution for about 5 minutes to displace all of the dissolved oxygen, which otherwise would lead to high results, since oxygen produces a diffusion current wave at about minus 0.1 volt.

The flow of nitrogen through the solution is stopped and diverted to pass as a blanket over the solution, and the polarogram of the solution may then be determined by means of a polarograph, such as a Sargent Model XX Visible Recording Polarograph, as described in Industrial Engineering Chemistry Analytical Edition, volume 18 (1946) pages 734–738.

The polarogram of a standard prepared in the same manner from 0.100 gram of C. P. purity 1,4-naphthoquinone is also determined.

The content of naphthoquinone in terms of 1,4-naphthoquinone in the crude phthalic anhydride is calculated as follows:

$$\frac{\text{Wave height}^1 \text{ of sample} \times 10}{\text{Wave height}^1 \text{ of standard} \times \text{weight}^2 \text{ of sample}} = \% \text{ naphthoquinone}$$

[1] Millimeters.  [2] Grams.

The content of maleic anhydride in phthalic anhydride can be determined polarographically in similar manner in N/10 hydrochloric acid solution rather than at pH 6 obtained with KH₂PO₄ as above. The determination is based on the principle that maleic acid is reduced at the dropping mercury electrode at a half-wave potential of minus 0.7 volt versus the saturated calomel electrode in N/10 hydrochloric acid solution. A solution containing not more than 0.100 gram of maleic anhydride per liter gives a diffusion current directly proportional to the concentration of maleic acid.

The effectiveness of maleic anhydride in bringing about an essentially complete removal of naphthoquinone type colored impurities in crude phthalic anhydride is demonstrated by tests, the results of which are listed in Table I below. In carrying out these tests synthetic mixtures of purified phthalic anhydride (PAA) possessing satisfactory color properties and naphthoquinone (NQ) were prepared and the mixtures were heated and fractionally distilled in the presence and absence of added maleic anhydride (MAA), as illustrated in Table I below:

TABLE I

*Removal by maleic anhydride of naphthoquinones from synthetic mixtures thereof with phthalic anhydride*

| Mixture | Hours Atm. Reflux | Per Cent Residue | Main Fraction | | |
| --- | --- | --- | --- | --- | --- |
| | | | S. P. | Pt-Co Color (Initial) | Pt-Co Color (After 4 hours at 180° C.) |
| PAA+2% NQ | 8 | nil | 129.8 | 500 | (¹) |
| PAA+2% MAA | 8 | nil | 130.8 | 10 | 15 |
| PAA+2% NQ+2% MAA | 8 | 5.6 | 130.8 | 10 | 30 |

[1] Much darker than 500.

The butene-1,4-dioic acid or anhydrides may be used advantageously in combination with sodium bisulfite as illustrated in Examples 2 and 3. When sodium bisulfite is employed in conjunction with butene-1,4-dioic acids, it accelerates the rates at which (a) naphthoquinone is changed and eliminated, and (b) phthalic anhydride is purified, and appears to provide a somewhat more complete purification of the phthalic anhydride than is obtainable by the use of butene-1,4-dioic acids or anhydrides alone. Moreover, sodium bisulfite has the effect of destroying excess maleic anhydride, and thus serves to obviate the necessity for separating excess of this purifying agent by fractional distillation. The sodium bisulfite is preferably employed in amounts ranging from about 0.2 to 1% by weight of the crude phthalic anhydride, although other amounts may be used. As illustrated in Examples 2 and 3, it is preferred to withhold addition of the sulfite compound for some time, say 1 to 2 hours after the addition of butene-1,4-dioic acids is complete while maintaining the temperature of the mixture at about 180° C. so as to minimize the possibility of lowering the effectiveness of butene-1,4-dioic acid. Sodium and potassium sulfites, bisulfites, and hydrosulfites may be used similarly with analogous results.

The invention is not limited to the purification of crude phthalic anhydride products of the type illustrated in the examples; it may be applied to improve the color characteristics of any phthalic anhydride which contains naphthoquinone impurities, and which cannot be purified satisfactorily by convention heat-ageing followed by fractional distillation. Thus, as shown in Example 6, the improved process may be used to purify the form of crude phthalic anhydride hereinbefore called "hay," which is generally purer than the form hereinbefore called "scale."

The following specific examples further illustrate the invention.

Example 1

500 grams of crude phthalic anhydride were charged into a 1 liter glass still provided with a glass reflux column 18″ long and 1″ in diameter packed with ¼″ x ¼″ glass rings. The crude phthalic anhydride possessed a setting point of 127.5° C. and was obtained by oxidizing naphthalene vapors with air in the presence of a catalyst comprising a vanadium oxide, passing the gaseous reaction products through a vapor cooler to a condenser, cooling the gases in said condenser to about 75° C. so as to condense substantially all of the phthalic anhydride contained in said gases as a solid, and periodically thawing and removing the phthalic anhydride deposited in said condenser, while diverting the gas stream to a second condenser. The still contents were then heated to about 180° C., and 2.5 grams of maleic anhydride were added. The agitated, molten mixture was heated to refluxing under atmospheric pressure (270–280° C.) for about 8 hours, and distilled through the aforesaid column under an absolute pressure of 15–25 mm. of mercury. The distillate was collected in 3 fractions: an initial or "lights" cut amounting to about 10% by weight of the distilland, a second or main fraction amounting to about 70% of the distilland, and a final or "tail" fraction representing the balance. The color of a molten sample of the main fraction thus obtained was determined by reference to the Pt-Co scale of color standards described above. The sample was then heated to 180° C. for 4 hours, and its color again noted.

A control run was similarly made with the same lot of crude phthalic anhydride except that the addition of maleic anhydride was omitted.

The main fraction obtained when maleic anhydride was employed possessed a Pt-Co color of 5 initially, and a Pt-Co color of 30 after 4 hours at 180° C., whereas the main fraction obtained when maleic anhydride was omitted had a Pt-Co color of 50 initially and a Pt-Co color of 100 after 4 hours at 180° C., as shown in the following table:

|  | With Maleic Anhydride | Without Maleic Anhydride |
| --- | --- | --- |
| Total Distillate Yield, Per Cent | 92.5 | 88.5. |
| S. P.[1] of crude phthalic anhydride | 127.5° C | 127.5° C. |
| S. P.[1] of lights Fraction | 130.6° C | 130.5° C. |
| S. P.[1] of main Fraction | 130.8° C | 131.1° C. |
| S. P.[1] of tail Fraction | 130.9° C | 130.7° C. |
| Initial Color of lights Fraction | Pt-Co 500 | Pt-Co 125. |
| Initial Color of main Fraction | Pt-Co 5 | Pt-Co 50. |
| Initial Color of tail Fraction | Pt-Co 500 | Pt-Co 500. |
| Color of Main Fraction after 4 hours at 180° C. | Pt-Co 30 | Pt-Co 100. |

[1] Setting Point.

Example 2

500 grams of the same lot of crude phthalic anhydride that was employed in Example 1 were heated with 2.5 grams of added maleic anhydride, and fractionally distilled in the same manner as described in the foregoing example except that 2.5 grams of crystallized sodium bisulfite were added to the mass about one hour following the addition of the maleic anhydride. The purified phthalic anhydride thus obtained possessed better color and color stability than that obtained in similar manner by omitting the addition of sodium bisulfite (see Example 1), or by omitting the addition of both the maleic anhydride and the sodium bisulfite, as shown in the following table.

|  | With Maleic Anhydride and Sodium Bisulfite | Without Maleic Anhydride and Sodium Bisulfite |
| --- | --- | --- |
| Total yield of distillate, percent | 88.4 | 88.5. |
| S. P. of crude phthalic anhydride | 127.5° C | 127.5° C. |
| S. P. of lights Fraction | 129.5° C | 130.5° C. |
| Initial color of lights Fraction | Pt-Co 20 | Pt-Co 125. |
| S. P. of main Fraction | 131.0° C | 131.1° C. |
| Initial color of main Fraction | Pt-Co 5 | Pt-Co 50. |
| Color of main Fraction after 4 hours at 180° C. | Pt-Co 10 | Pt-Co 100. |
| S. P. of tail Fraction | 131.0° C | 130.7° C. |
| Initial color of tail Fraction | Pt-Co 5 | Pt-Co 500. |
| Color of tail Fraction after 4 hours at 180° C. | Pt-Co 10 |  |

Example 3

5000 grams of crude phthalic anhydride similar to the type described in Example 1 were heated to 180° C. in an iron still provided with an iron reflux column 18″ long and 2″ in diameter packed with ¼″ x ¼″ glass rings. 12.5 grams of maleic anhyrdide were then stirred into the molten charge at 180° C., and about 1 hour thereafter 50 grams of sodium bisulfite were added. The still contents were heated under atmospheric pressure during 3–4 hours to refluxing (275–285° C.), and refluxed for 8 hours. The mass was then fractionally distilled under an absolute pressure of 15–25 mm. of mercury, and fractions each corresponding to 10% of the weight of the crude phthalic anhydride were collected separately until 86% of the charge had been recovered as distillate, which corresponds approximately to the recovery obtained in normal commercial operations. The color of each fraction was determined immediately and after 4 hours heating at 180° C., as usual.

As shown in the following table, all fractions of purified phthalic anhydride obtained by employing maleic anhydride and sodium bisulfite were lighter in color both initially and after 4 hours at 180° C. than corresponding fractions obtained when the maleic anhydride and sodium bisulfite were omitted.

|  | With Maleic Anhydride | Without Maleic Anhydride |
|---|---|---|
| Total Distillate Yield (per cent by wt. of crude phthalic anhydride). | 92.9 | 98.5. |
| S. P. of lights Fraction | 129.8° C | 130.5° C. |
| S. P. of main fraction | 131.0° C | 131.0° C. |
| S. P. of tail fraction | 130.6° C | 130.6° C. |
| Initial color of lights Fraction | Pt-Co 500 | Pt-Co 500. |
| Initial color of main fraction | Pt-Co 20 | Pt-Co 150. |
| Initial color of tail fraction | Pt-Co 20 | Pt-Co 150. |
| Color of main fraction after 4 hours at 180° C. | Pt-Co 35 | Pt-Co over 500. |
| Color of tail fraction after 4 hours at 180° C. | Pt-Co 80 | Pt-Co over 500. |

| Purification Agent Added (per cent by weight of Crude Phthalic Anhydride) | Distillate Fractions (Total recovery=86% of Crude Phthalic Anhydride) | | | | | | | | | | | | | | | | |
|---|---|---|---|---|---|---|---|---|---|---|---|---|---|---|---|---|---|
| | 0–10% | | 10–20% | | 20–30% | | 30–40% | | 40–50% | | 50–60% | | 60–70% | | 70–80% | | 80–86% | |
| | Color | S. P. | Color | S. P. | Color | S. P. | Color | S. P. | Color | S. P. | Color | S. P. | Color | S. P. | Color | S. P. | Color | S. P. |
| None | 125–500 | 129.9 | 85–150 | 130.7 | 85–150 | 130.9 | 100–150 | 131.2 | 85–150 | 131.3 | 40–125 | 131.3 | 35–55 | 131.3 | 35–50 | 131.4 | 35–60 | 131.3 |
| ¼% Maleic Anhydride plus 1% Sodium Bisulfite | 30–150 | 129.4 | 15–50 | 131.0 | 5–10 | 131.2 | 5–15 | 131.2 | 5–15 | 131.2 | 5–15 | 131.2 | 5–15 | 131.2 | 5–15 | 131.3 | 5–15 | 131.3 |

Note.—Setting point are in degrees centigrade. Colors are expressed in terms of the Pt-Co scale; the first number represents the initial color, whereas the second number indicates the color after 4 hours at 180° C.

*Example 4*

500 grams of molten crude phthalic anhydride similar to the type described in Example 1 were mixed with 2.5 grams of fumaric acid, and the mixture was refluxed at 270°–280° C. for 8 hours and then fractionally distilled as described in Example 1. The main fraction of purified phthalic anhydride distillate thus obtained possessed a Pt-Co color of 5 initially, and a Pt-Co color of 40 after 4 hours ageing at 180° C.; whereas the main fraction obtained in similar manner, but omitting the addition of fumaric acid, possessed a Pt-Co color of 40 initially, and a Pt-Co color of 70 after 4 hours ageing at 180° C.

An identical result was obtained by replacing fumaric acid with an equal weight of maleic acid in the foregoing example.

*Example 5*

500 grams of molten crude phthalic anhydride similar to the type described in Example 1 were mixed with 2.5 grams of citraconic anhydride; the mixture was refluxed at 270–280° C. for 8 hours, and then fractionally distilled as described in Example 1. The main fraction of purified phthalic anhydride distillate thus obtained possessed a Pt-Co color of 5 initially, and a Pt-Co color of 50 after 4 hours ageing at 180° C.; whereas the main fraction obtained similarly but omitting the addition of citraconic anhydride, possessed a Pt-Co color of 40 initially, and a Pt-Co color of 70 after 4 hours ageing at 180° C.

*Example 6*

500 grams of phthalic anhydride "hay" were melted and 15 grams of maleic anhydride were added thereto at about 180° C. The mixture was then refluxed for 8 hours in a glass still and then fractionally distilled in the manner described in Example 1.

A control run, wherein the addition of maleic anhydride was omitted, was also carried out in otherwise identical manner.

The purified phthalic anhydride obtained when maleic anhydride was added possessed much better color properties than the product obtained when the maleic anhydride was omitted, as shown in the following table:

While the above describes the preferred embodiments of this invention, it will be understood that departures may be made therefrom within the scope of the specification and claims.

We claim:

1. In a process for the purification of crude phthalic anhydride containing naphthoquinone type impurities, the steps which comprise adding thereto a small quantity of a compound selected from the group consisting of butene-1,4-dioic acids and anhydrides thereof heating the resulting mixture to a temperature at least above the melting point of the crude phthalic anhydride, whereby the impurities are converted to removable form and thereafter recovering the purified phthalic anhydride by volatilization.

2. In a process for the purification of crude phthalic anhydride containing naphthoquinone type impurities, the steps which comprise adding thereto a small quantity of a compound selected from the group consisting of butene-1,4-dioic acids and anhydrides thereof containing not more than six carbon atoms, heating the resulting mixture to a temperature at least above the melting point of the crude phthalic anhydride whereby the impurities are converted to removable form and thereafter recovering the purified phthalic anhydride by volatilization.

3. In a process for the purification of crude phthalic anhydride containing naphthoquinone type impurities, the steps which comprise adding thereto a compound selected from the group consisting of butene-1,4-dioic acids and anhydrides thereof containing not more than six carbon atoms, in an amount equal to at least about one tenth by weight of the weight of the naphthoquinone type impurities present, heating the resulting mixture to a temperature at least above the melting point of the crude phthalic anhydride for a period sufficient to convert the impurities to removable form and thereafter recovering the purified phthalic anhydride by volatilization.

4. In a process for the purification of phthalic anhydride obtained by catalytic oxidation of naphthalene vapors, and containing naphthoquinone type impurities, the steps which comprise adding thereto a quantity between about 0.25 and 1.0% by weight based on the phthalic anhydride of a compound selected from the group consisting of butene-1,4-dioic acids and anhydrides thereof containing not more than six carbon atoms, heating the resulting mixture under refluxing conditions for a period sufficient to convert the impurities substantially completely to removable form, and thereafter recovering the purified phthalic anhydride by volatilization.

5. In a process for the purification of phthalic anhydride obtained by catalytic oxidation of naphthalene vapors, and containing naphthoquinone type impurities, the steps which comprise adding thereto a quantity between about 0.25 and 1.0% by weight based on the phthalic anhydride of a compound selected from the group consisting of butene-1,4-dioic acids and anhydrides thereof containing not more than six carbon atoms together with a substance selected from the group consisting of sodium and potassium sulfites, bisulfites and hydrosulfites, heating the resulting mixture under refluxing conditions for a period between about 2 hours and about 10 hours sufficient to convert the impurities substantially completely to removable form, and thereafter recovering the purified phthalic anhydride by volatilization.

6. In a process for the purification of phthalic anhydride obtained by catalytic oxidation of naphthalene vapors, and containing naphthoquinone type impurities, the steps which comprise adding thereto a quantity of maleic anhydride between about 0.25 and 1.0% by weight based on the phthalic anhydride, heating the resulting mixture under refluxing conditions for a period sufficient to convert the impurities substantially completely to removable form, and thereafter recovering the purified phthalic anhydride by volatilization.

7. In a process for the purification of phthalic anhydride obtained by catalytic oxidation of naphthalene vapors, and containing naphthoquinone type impurities, the steps which comprise adding thereto a quantity of citraconic anhydride between about 0.25 and 1.0% by weight based on the phthalic anhydride, heating the resulting mixture under refluxing conditions for a period between about 2 and 10 hours, and thereafter recovering the purified phthalic anhydride by volatilization.

8. In a process for the purification of phthalic anhydride obtained by catalytic oxidation of naphthalene vapors, and containing naphthoquinone type impurities, the steps which comprise adding thereto a quantity of fumaric acid, between about 0.25 and 1.0% by weight based on the phthalic anhydride, heating the resulting mixture under refluxing conditions for a period between about 2 and 10 hours, and thereafter recovering the purified phthalic anhydride by volatilization.

9. A process for the purification of crude phthalic anhydride containing naphthoquinone type impurities which comprises melting the crude phthalic anhydride, adding thereto a compound selected from the group consisting of butene-1,4-dioic acids and anhydrides thereof containing not more than six carbon atoms, in an amount equal to at least about one-tenth the amount by weight of the naphthoquinones present, heating the mixture at a temperature between 200° C. and 305° C. for a period between 2 and 10 hours, and thereafter recovering the purified phthalic anhydride by volatilization.

10. In a process for the purification of phthalic anhydride obtained by catalytic oxidation of naphthalene vapors, and containing naphthoquinone type impurities, the steps which comprise adding thereto a quantity between about 0.25 and 1.0% by weight based on the phthalic anhydride of a compound selected from the group consisting of butene-1,4-dioic acids and anhydrides thereof containing not more than six carbon atoms, heating the mixture at about 180° C. for a period between 1 and 2 hours, thereafter adding between about 0.2% and 1% of sodium bisulfite based on the weight of the phthalic anhydride, and continuing the heating under refluxing conditions for an additional period of between about 8 and 9 hours, and thereafter recovering the purified phthalic anhydride by volatilization.

11. A process for the purification of crude phthalic anhydride containing naphthoquinone type impurities which comprises melting the crude phthalic anhydride, adding thereto a quantity between about 0.25 and 1% by weight based on the phthalic anhydride of a compound selected from the group consisting of butene-1,4-dioic acids and anhydrides thereof containing not more than six carbon atoms, heating the mixture at a temperature between about 200° C. and 305° C. for a period between about 2 and 10 hours, and thereafter recovering the purified phthalic anhydride by volatilization.

12. In a process for the purification of phthalic anhydride obtained by catalytic oxidation of naphthalene vapors, and containing naphthoquinone type impurities, the steps which comprise adding thereto a quantity between about 0.25 and 1.0% by weight based on the phthalic anhydride, of maleic anhydride, heating the mixture at about 180° C. for a period between 1 and 2 hours, thereafter adding between about 0.2% and 1% of sodium bisulfite based on the weight of the phthalic anhydride, and continuing the heating under refluxing conditions for an additional period of between about 8 and 9 hours, and thereafter recovering the purified phthalic anhydride by volatilization.

MAURICE E. BAILEY.
JOHN K. EVANS.

No references cited.

Certificate of Correction

Patent No. 2,510,852　　　　　　　　　　　　　　　　　　　　　June 6, 1950

MAURICE E. BAILEY ET AL.

It is hereby certified that errors appear in the printed specification of the above numbered patent requiring correction as follows:

Column 6, line 51, for the words "of higher" read *or higher*; column 9, line 1, for "anhydrides" read *anhydride*; column 10, line 68, for "anhyrdide" read *anhydride*; column 14, lines 8 and 9, after "between" insert *about*;

and that the said Letters Patent should be read with these corrections therein that the same may conform to the record of the case in the Patent Office.

Signed and sealed this 12th day of September, A. D. 1950.

[SEAL]

THOMAS F. MURPHY,
*Assistant Commissioner of Patents.*